US010814836B2

(12) United States Patent
Houssat et al.

(10) Patent No.: US 10,814,836 B2
(45) Date of Patent: Oct. 27, 2020

(54) ADAPTER FOR THE CONNECTION OF A WIPER BLADE TO A DRIVE ARM OF A WIPER SYSTEM FOR A MOTOR VEHICLE

(71) Applicant: Valeo Systèmes d'Essuyage, Le Mesnil Saint Denis (FR)

(72) Inventors: Stéphane Houssat, Issoire (FR); Vincent Gaucher, Issoire (FR); Olivier Jomard, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 233 days.

(21) Appl. No.: 15/720,229

(22) Filed: Sep. 29, 2017

(65) Prior Publication Data

US 2018/0086313 A1    Mar. 29, 2018

(30) Foreign Application Priority Data

Sep. 29, 2016    (FR) .................................... 16 59352

(51) Int. Cl.
*B60S 1/40*    (2006.01)

(52) U.S. Cl.
CPC ........... *B60S 1/4009* (2013.01); *B60S 1/4038* (2013.01); *B60S 1/4045* (2013.01); *B60S 1/4048* (2013.01);
(Continued)

(58) Field of Classification Search
CPC ...... B60S 2001/4032; B60S 2001/4048; B60S 2001/4051; B60S 2001/4054;
(Continued)

(56) References Cited

U.S. PATENT DOCUMENTS

| 8,707,506 B1 * | 4/2014 | Wu ...................... B60S 1/4003 |
| | | 15/250.32 |
| 2014/0317875 A1 | 10/2014 | Tolentino et al. |

(Continued)

FOREIGN PATENT DOCUMENTS

| CN | 203819191 U | 9/2014 |
| CN | 105209305 A | 12/2015 |

(Continued)

OTHER PUBLICATIONS

Preliminary Search Report and Written Opinion issued in corresponding French Application No. 1659352, dated May 24, 2017 (6 pages).

(Continued)

*Primary Examiner* — Gary K. Graham
(74) *Attorney, Agent, or Firm* — Osha Liang LLP

(57) ABSTRACT

The invention has as its object an adapter (100) intended to attach a wiper blade to a drive arm of a wiper system for a motor vehicle, the adapter (100) including a head (1) and a body (2) which extend, one as an extension of the other, in a longitudinal direction (Ox) of the adapter (100), the adapter (100) comprising a means of connection (6) in rotation to a connector (8) that is integral with the wiper blade, the head (1) and the body (2) of the adapter (100) each being formed at least by an upper wall (10, 20), from which at least two lateral flanks (11a, 11b, 21a, 21b) emerge so as to define an internal volume (101) into which the connector (8) is capable of extending, the body (2) of the adapter (100) comprising at least one means of engagement (3) to engage the adapter (100) with a yoke (500) of the drive arm (5), characterized in that the head (1) of the adapter (100) includes a second means of engagement (4) defining at least one housing (400) capable of accepting both an upper wall (Continued)

Figure 1:
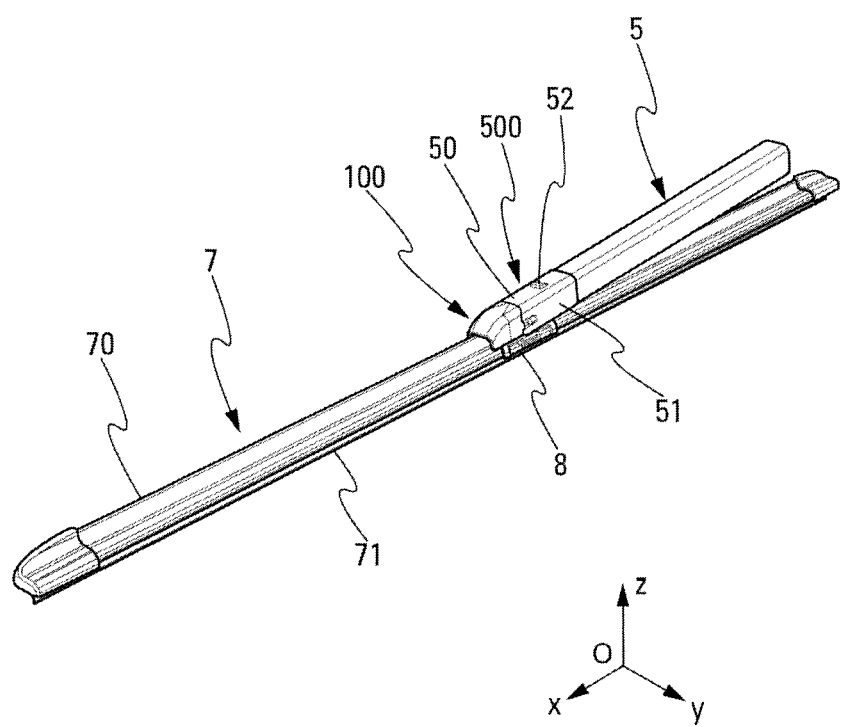

(50) of the yoke (500) and a rib (9) of the body (2) of the adapter (100).

18 Claims, 4 Drawing Sheets

(52) U.S. Cl.
CPC .................. *B60S 2001/4054* (2013.01); *B60S 2001/4058* (2013.01)

(58) Field of Classification Search
CPC ...... B60S 2001/4058; B60S 2001/4061; B60S 1/38; B60S 1/40; B60S 1/387; B60S 1/3849; B60S 1/3853; B60S 1/4003; B60S 1/4009; B60S 1/4038; B60S 1/4048; B60S 1/4064; B60S 1/4077; B60S 1/4087; B60S 1/4045; B60S 2001/4022
See application file for complete search history.

(56) References Cited

U.S. PATENT DOCUMENTS

| | | |
|---|---|---|
| 2015/0258967 A1 | 9/2015 | Lepper et al. |
| 2016/0107616 A1* | 4/2016 | Young, III ................ B60S 1/40 |
| | | 15/250.33 |
| 2017/0334407 A1* | 11/2017 | Kawashima .......... B60S 1/4077 |

FOREIGN PATENT DOCUMENTS

| | | | |
|---|---|---|---|
| EP | 2781416 A1 | 9/2014 | |
| FR | 3026074 A1 | 3/2016 | |
| WO | WO-2014173784 A1 * | 10/2014 | ............ B60S 1/3849 |
| WO | 2016/061474 A1 | 4/2016 | |

OTHER PUBLICATIONS

The First Office Action issued in Corresponding Chinese Application No. 201710887999.X, dated Dec. 4, 2019 (17 pages).

* cited by examiner

ADAPTER FOR THE CONNECTION OF A WIPER BLADE TO A DRIVE ARM OF A WIPER SYSTEM FOR A MOTOR VEHICLE

The invention relates to the field of wiping and/or cleaning the glazed surfaces of a motor vehicle, and it concerns more particularly a connection device between a windscreen wiper blade and a drive arm thereof.

Windscreen wipers for motor vehicles are designed to remove, by wiping, the liquids and dirt which may obscure the view that the driver has of his environment. These wiper blades generally comprise at least one drive arm which performs an angular reciprocal movement against the glazed surface concerned, and at least one wiper blade equipped with a scraper blade made of an elastic material. By rubbing against a glazed surface, this blade wipes the water and a certain amount of dirt from it and removes them from the field of vision of the driver.

Whatever the configuration of the windscreen wiper blade, either as articulated brackets which retain the scraper blade in a plurality of distinct zones, or as a metal blade which holds the scraper blade over its entire length, this is attached to the drive arm of the wiper system by a connection device which generally comprises at least one connector and one adapter. The connector is secured to the wiper blade, and the adapter is a component which is configured, on the one hand, in order to cooperate with the connector and, on the other hand, in order to be engaged with a terminal part, or yoke, of the drive arm. The connector and the adapter cooperate in order to achieve the attachment of the wiper blade on the drive arm and the articulated connection between these two assemblies.

In the market for the sale of components and accessories intended for retrofitting to motor vehicles, it is known to propose one and the same same wiper blade, which is sold equipped with its own connector, and which is adaptable to a plurality of types of drive arm. There is therefore a need to design an adapter that is suitable for use with the largest possible number of types of arm yokes and with the largest possible number of types of wiper blade connectors, since it is the adapter which forms the interface between these two elements. In this context, the ergonomics for the assembly or separation of the wiper blade from the drive arm is an essential characterizing feature, and there is a need to implement a solution that is easy to use, yet reliable and long-lasting.

The present invention has as its aim to propose a solution allowing the implementation of the connection of a wiper blade to a particular type of drive arm yoke for a wiper system of a motor vehicle. The particular type of drive arm yoke with which the adapter according to the invention is more particularly intended to cooperate exhibits, perpendicularly in its longitudinal direction of extension, a straight section in the form of an inverted "U", of which the vertical legs are constituted by two side walls of this yoke and of which the transversal leg is formed by an upper wall of said yoke, said upper wall including at least one through opening. The upper wall and the side walls of this yoke thus define between them a receiving volume. The particular yoke to which the invention applies more specifically also includes two slots, each disposed longitudinally on one of its side walls from an edge of a free front end of this side wall.

In order to accomplish the aim that it has set itself, the invention proposes an adapter intended to attach a wiper blade to a drive arm of a wiper system for a motor vehicle, the adapter including a head and a body which extend, one as an extension of the other, in a longitudinal direction of the adapter, the adapter comprising a means of connection in rotation to a connector that is integral with the wiper blade, the head and the body of the adapter each being formed at least by an upper wall from which at least two lateral flanks emerge so as to define an internal volume into which the connector is capable of extending, the body of the adapter comprising at least one means of engagement to engage the adapter with a yoke of the drive arm, characterized in that the head of the adapter includes a second means of engagement defining at least one housing capable of accepting both an upper wall of the drive arm yoke, in particular its free end, and a rib of the adapter body.

By convention, in the whole of the present document, the expression "longitudinal" applies to the direction in which the head and the body of the adapter according to the invention extend, one as an extension of the other, the expression "transversal" applies to a direction substantially perpendicular to the longitudinal direction and joining between them the lateral flanks of the adapter according to the invention, and the expression "vertical" designates the direction perpendicular both to the longitudinal direction and to the transversal direction.

In a wiper system including a wiper blade equipped with its connector and assembled, by means of an adapter according to the invention, with a yoke of a drive arm of said wiper system, the expressions "lower" or "bottom" designate more specifically the regions close to the surface to be wiped in the vertical direction, and the expressions "upper" or "top" designate the regions which are remote from the latter in this same vertical direction.

With reference to these different directions, the head and the body of the adapter according to the invention thus each exhibit, in a vertical transversal plane, a section of which the form is substantially that of an inverted "U" formed by their upper wall from which the two lateral, vertical or substantially vertical flanks of this head and/or of this body extend perpendicularly or substantially perpendicularly. The upper wall and the lateral flanks of the head and of the body of the adapter according to the invention together define an internal volume thereof.

Advantageously, the housing for accepting the second means of engagement is defined, on the one hand, by a tooth capable of bearing against an upper wall of the drive arm yoke on the exterior of the internal volume of the adapter, and, on the other hand, by a hook capable of cooperating with the rib disposed in the body of the adapter. According to another characterizing feature of the invention, the tooth extends in the longitudinal extension of the upper wall of the head, in the direction of the body of the adapter, beyond an edge formed at the interface between the head and the body.

According to another characterizing feature of the invention, the hook is formed by a foot which extends, within the internal volume of the adapter, in particular from the upper wall of the head of this adapter, away from the latter in the previously defined vertical direction. An attachment extends, for example in a longitudinal direction, substantially parallel to that of the aforementioned tooth from the free end of the foot of the hook. This attachment comprises, advantageously at its free end in the longitudinal direction of extension of the head of the adapter according to the invention, a bead responsible for engaging the hook on the rib.

According to another characterizing feature of the invention, the rib extends within the internal volume in a transversal direction to the body, perpendicular to a longitudinal axis of extension of this body. The rib is disposed, for example, in the body of the adapter and extends substantially transversely within the internal volume of this body. According to one embodiment of the invention, this rib is in contact with the lateral flanks of the body of the adapter, and as such constitutes a means of reinforcing the latter. A suchlike rib is advantageously moulded simultaneously with the lateral flanks of the body.

According to another of its characterizing features, the adapter according to the invention includes means of pivoting its head in rotation in relation to its body about a substantially transversal axis, a suchlike transversal axis being situated, for example, in the vicinity of the interface between the head and the body. According to one particular embodiment of the invention, the head is movable in relation to the body.

Alternatively, the head and the body are two distinct and separable components, these two components nevertheless being rendered integral the one with the other by the second means of engagement.

In the whole of the present document, the expression "closed position" is used to designate the position of the adapter according to the invention in which the head and the body thereof extend, one as a longitudinal extension of the other, and the expression "open position" is used to designate any position of the adapter according to the invention in which the head thereof is pivoted in rotation in relation to its body thanks to the aforementioned means of pivoting in rotation, or is separated from the body.

In the open position of the adapter, the second means of engagement is remote from the body of the adapter, both in the longitudinal direction and in the vertical direction, although by reason of the direction of the axis about which it pivots in relation to the body, the head of the adapter remains aligned with its body in the transversal direction.

According to the invention, the means of pivoting the head of the adapter in rotation in relation to its body include at least one articulation strap, in particular two articulation straps, each disposed between a lateral flank of the head and a lateral flank of the body. Each strap forms a hinge which links the head and the body of the adapter.

According to different characterizing features of the invention, which may be taken alone or in combination:
- the body comprises at least two crossmembers which extend, within the internal volume, in the direction of the head in the longitudinal extension of the lateral flanks of the body;
- the first means of engagement comprises a pad defined by a distal wall and by side walls which extend substantially perpendicularly to the distal wall;
- the pad protrudes from an upper wall of the body on the exterior of the internal volume;
- the pad comprises at least one step which extends in the longitudinal direction beyond the one at least of the side walls defining the pad;
- the step extends longitudinally in the direction of the head;
- the first means of engagement and the second means of engagement are provided longitudinally to either side of the means of connection in rotation;
- a hole is disposed in the upper wall of the body in such a way that it extends in the longitudinal direction beyond the first means of engagement in the direction of the head of the adapter;
- a means permitting the linking in rotation of the adapter with a connector of a wiper system is disposed in the region of the body of this adapter;
- the first means of engagement and the second means of engagement are provided longitudinally to either side of the means of connection in rotation;
- the means of connection in rotation of the adapter to the connector is, for example, a single strand disposed from an interior face of the at least one of the lateral flanks of the body and extending towards the interior of the internal volume. In an alternative or complementary manner, the means of connection in rotation of the adapter to the connector is an opening provided in at least one of the lateral flanks of the body of the adapter. According to a variant embodiment, the means of connection in rotation is constituted by at least two cylindrical apertures of circular section or square section disposed in each lateral flank of the body of the adapter. These apertures cooperate with a connector associated with a wiper blade at the time of the connection of a suchlike wiper blade to the adapter according to the invention. More specifically, these apertures are each intended to be engaged on a strand formed integrally with the connector or on a shaft attached to the connector;
- according to yet another variant embodiment, the means of connection in rotation comprises on one side a single strand provided in one of the lateral flanks of the body and a single aperture provided in the other lateral flank of the body.

If the transversal dimension of the head or of the body of the adapter according to the invention is defined as the distance, in a plane substantially parallel to the plane of the upper wall of this head or of this body, measured between surfaces of these lateral flanks situated on the exterior of the internal volume of the adapter, the transversal dimension of the head of the adapter according to the invention is greater than the transversal dimension of the body of the adapter according to the invention. Similarly, if the height of the head or of the body of the adapter according to the invention is defined as the dimension, measured in a plane substantially parallel to that of the lateral flanks of this head or of this body, between the surface of the upper wall situated on the exterior of the internal volume of the adapter and the lower edge of the lateral flanks, the height of the head of the adapter according to the invention is greater than the height of its body. In other words, the head is higher and/or wider than the body of the adapter of the invention.

The invention also includes a connection device comprising an adapter as described in thee present document and a connector capable of being secured to a wiper blade, characterized in that the adapter and the connector are linked by the means of connection in rotation.

The invention finally includes a wiper system, in particular for a motor vehicle, comprising a wiper blade, a drive arm and an adapter as described in the present document or a connection device as mentioned above, in which the adapter is housed in a yoke of the drive arm, in which the first means of engagement and the second means of engagement are disposed in relation to the upper wall of the body in such a way as to enclose both an upper wall of the yoke and the previously defined rib.

In an advantageous manner, the dimensions of the head and of the body of the adapter respectively are defined in such a way that an edge formed at the interface between said head and said body is capable of bearing edge-to-edge against the thickness, respectively, of the upper wall and/or of the side walls of the yoke. A continuous exterior surface is thus formed once the adapter has been assembled with the drive arm.

In a suchlike wiper system, the first means of engagement extends in an opening disposed in the upper wall of the yoke.

Once the adapter according to the invention has been assembled with a connector of a wiper blade, the positioning of the adapter according to the invention on the yoke of a drive arm of the type described previously is performed in the following manner.

Advantageously, the adapter is first of all placed in an open position in which its head is pivoted in rotation in relation to its body thanks to the previously defined means of pivoting. Alternatively, the head is separated from the body.

The body of the adapter is then engaged with the yoke of the drive arm in such a way that the pad of the first means of engagement is inserted into the through opening provided in the upper wall of this yoke.

A movement of rotation of the body of the adapter is then performed about a transversal axis of the adapter in order to bring the upper wall of this body into the vicinity of the upper wall of the yoke of the drive arm.

The head is then pivoted in rotation in relation to the body until the adapter is in its closed position. In the course of this movement of pivoting in rotation of the head of the adapter in relation to its body, the hook then performs locking of the head of the adapter to the body thereof. In an alternative manner, the head may be attached to the body until the hook locks the head of the adapter in relation to its body.

When the adapter according to the invention is engaged in the yoke, the upper wall of the body of this adapter, within the receiving volume of this yoke, bears against the upper wall of the latter, and the lateral flanks of this same body advantageously bear against the side walls of the yoke within this same receiving volume. Thus, the upper wall of this yoke is sandwiched between, on the one hand, the upper wall of the body of the adapter according to the invention and, on the other hand, both the tooth carried by the first means of engagement and the second means of engagement.

In order to separate the adapter according to the invention from the yoke of the drive arm, it is sufficient to pivot the head of the adapter in rotation in relation to the body thereof, or, in other words, to place the adapter in an open position. It is thus necessary to unlock the hook of the second means of engagement from the transversal rib disposed in the body of the adapter by exerting a vertical pressure on the tooth of this second means of engagement, and then to disengage the adapter from the yoke of the drive arm.

Figure 2:
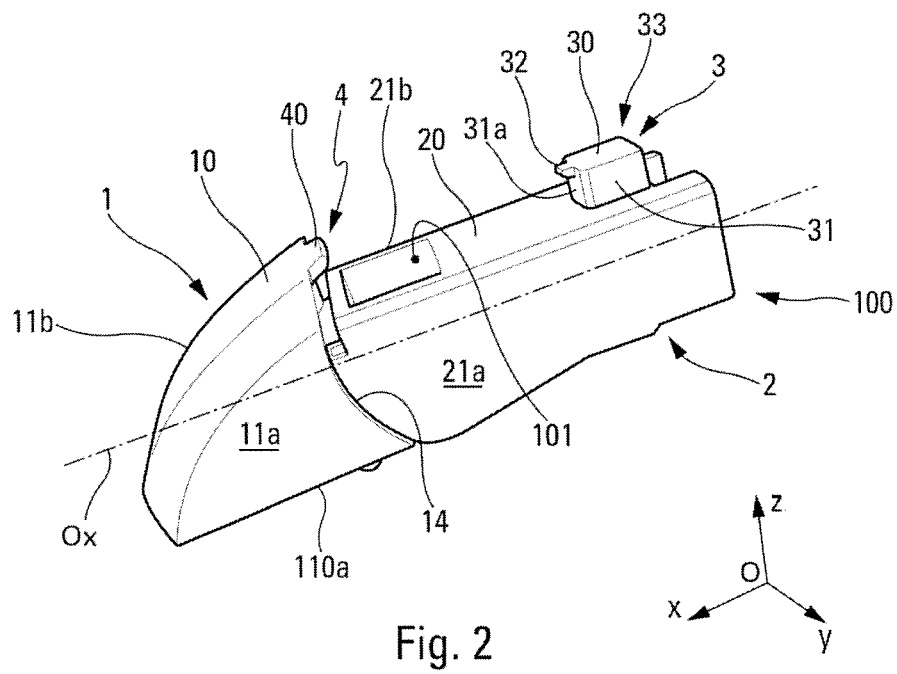
Figure 3:
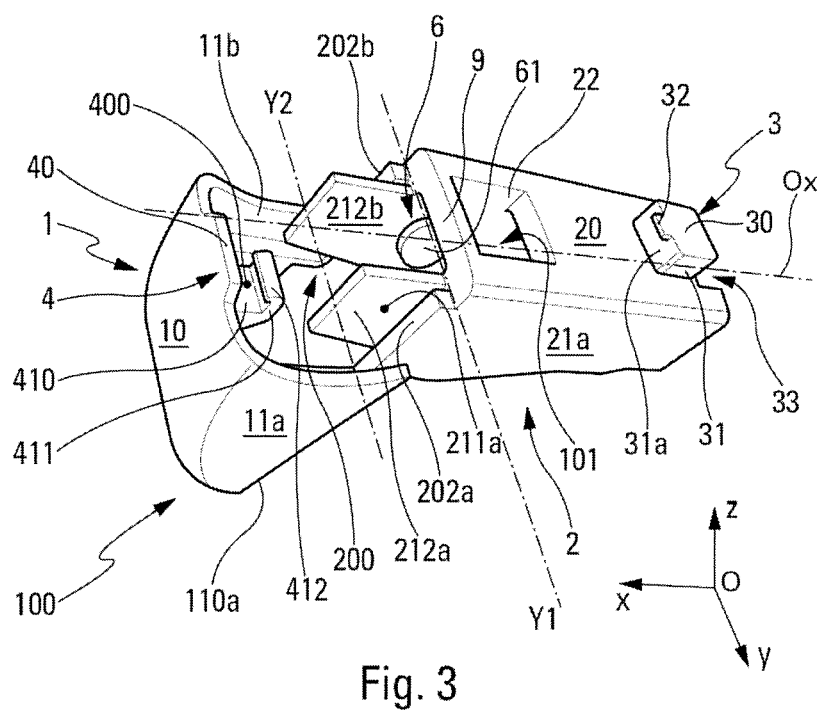
Figure 4:
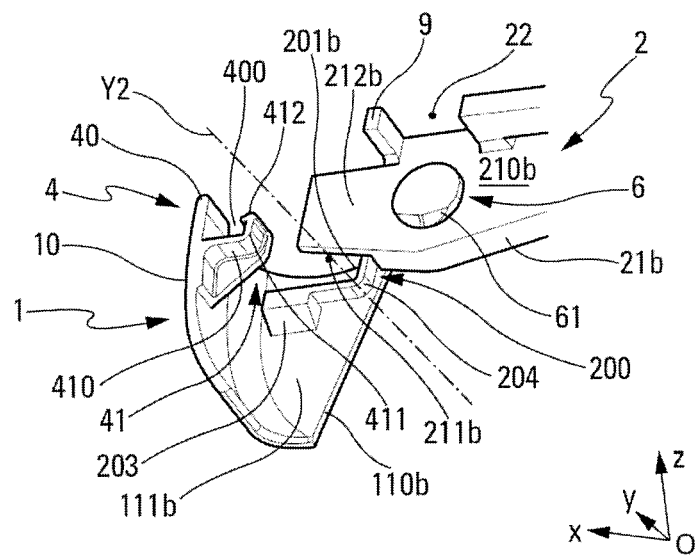
Figure 5:
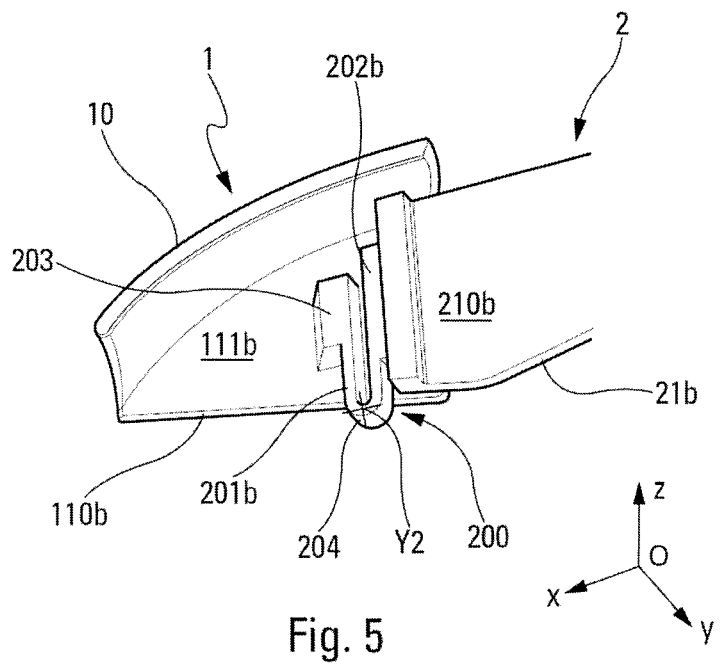
Figure 6:
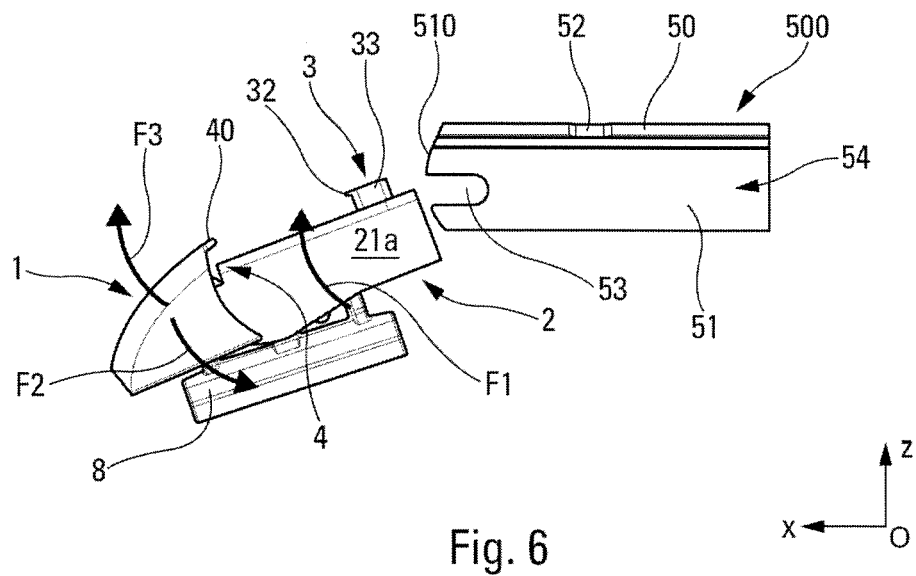
Figure 7:
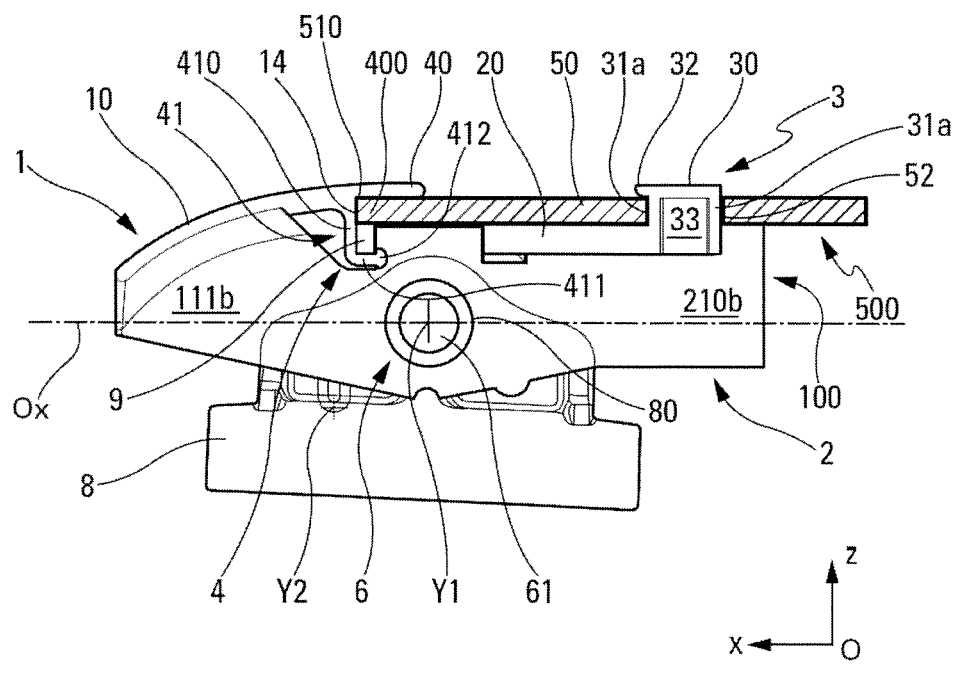

Other characterizing features and advantages of the present invention will be appreciated more clearly with the help of the description which follows and the drawings, in which:

FIG. 1 is a view in perspective of a wiper system for a motor vehicle comprising a drive arm assembled with a wiper blade, FIG. 2 is a view in perspective of an adapter according to the invention in its closed position, FIG. 3 is a view in perspective of an adapter in an open position, FIG. 4 is a close-up sectional view of the head and of the body of the adapter according to the invention in an open position of the adapter, FIG. 5 is a close-up sectional view of the head and of the body of the adapter according to the invention in its closed position, FIG. 6 illustrates the assembly of an adapter according to the invention with the yoke of a drive arm of a wiper system for a motor vehicle, and FIG. 7 is a sectional view of a connection device, where the adapter according to the invention is assembled with a connector.

It should be noted first of all that, although the figures disclose the invention in a detailed manner for its implementation, they may, of course, also serve to better define the invention if necessary. It must also be noted that similar elements and/or elements performing the same function are indicated by the same designation in all the figures.

Furthermore, with reference to the orientations and directions defined previously, the longitudinal direction is represented in all the figures by the direction of an axis Ox, the transversal direction is represented by the direction of an axis Oy, and the vertical direction is represented by the direction of an axis Oz. These different axes together define an orthonormal mark (Oxyz) represented in the different figures. In this mark, the orientation "front" is defined by the positive direction of the axis Ox, the orientation "rear" being defined by the negative direction of this same axis, and the expressions "top" or "upper" are represented by the positive direction of the axis Oz, the expressions "bottom" or "lower" being represented by the negative direction of this same axis Oz. In the assembly formed by an adapter according to the invention mounted on a yoke of a drive arm, the expression "front" also designates the elements closest to the free end of this yoke, by which the latter cooperates with the adapter according to the invention, and the expression "rear" designates the elements closest to the point of attachment of the drive arm to a vehicle, opposite the "front" elements in the longitudinal direction of extension of this arm and the adapter according to the invention.

FIG. 1 illustrates a wiper system for a motor vehicle. This system comprises a drive arm 5 which performs an angular reciprocal movement against a surface to be wiped and a wiper blade 7, itself constituted, for example, by one or a plurality of vertebras 70 supporting a scraper blade 71 made of an elastic material. In the angular reciprocal movement of the drive arm 5, the wiper blade 7 and its scraper blade 71 are driven in an angular movement against the glazed surface in order to achieve the desired wiping/cleaning operation.

The wiper blade 7 is attached to the drive arm 5 via a connection device which comprises a connector 8 and an adapter 100. The connector 8 is secured to the wiper blade 7, and the adapter 100 provides an interface between this connector 8 and a terminal part of the drive arm 5, otherwise referred to as a yoke 500. The connector 8 and the adapter 100 cooperate in order to achieve the attachment of the wiper blade 7 on the drive arm 5 and an articulated link between these two elements.

The invention has as its object a particular type of adapter 100 intended to cooperate with a particular type of drive arm yoke 500, in particular with a view to supplying replacement wiper blades for fitting on a drive arm having this particular type of yoke 500.

The yoke 500, represented schematically in a view from the side in FIG. 6, with which the adapter 100 according to the invention is intended to cooperate, includes an upper wall 50 from which two side walls 51 extend perpendicularly or substantially perpendicularly to the upper wall 50. The yoke 500 thus exhibits a transversal section of which the form is substantially that of an inverted "U", and of which the base is formed by the upper wall 50, and where the branches are formed by the side walls 51. The upper wall 50 and the side walls 51 of this yoke 500 together define a receiving volume 54, visible in FIG. 6.

The yoke 500 includes also, disposed in an upper wall 50, a through opening 52, and each of its side walls 51 includes, disposed from its free front edge 510, a slot 53 which extends substantially longitudinally towards the rear of the drive arm 5, substantially parallel to the upper wall of the yoke 500. Suchlike slots 53 exhibit an oblong form, and these slots open onto a free front end edge 510 of the yoke 500.

With reference to FIGS. 2 to 7, the adapter 100 according to the invention includes a head 1 and a body 2, the head 1 extending, in the directions previously defined, towards the front of the adapter 100 according to the invention, and the body 2 extending, in the directions previously defined, towards the rear of this same adapter 100. According to one embodiment of the invention, the adapter 100 is produced by the injection of a polymer material into a mould, and the body 2 and the head 1 are integrally formed in a single block. Advantageously, the selected material possesses mechanical properties imparting a certain softness to the adapter 100. The embodiment in this case is a first embodiment of the adapter where the head 1, although movable in relation to the body 2, is connected thereto.

The invention proposes a second embodiment where the head 1 is a distinct and separate component of the body 2, the head 1 nevertheless being attached to the body 2 by a second means of engagement 4 which comprises at least one housing 400 capable of accepting both a free end of an upper wall 50 of the yoke 500 and a rib 9 disposed in the body 2. The second means of engagement 4, in addition to contributing to the attachment of the adapter 100 in the yoke 500, also ensures securing of the head 1 on the body 2. The description below more particularly proposes the first embodiment, although it is intended that this description is applicable to the adapter according to the second embodiment.

As indicated in FIGS. 2 and 3, the body 2 is formed by an upper wall 20 and by two substantially vertical lateral flanks 21a, 21b, which each extend from a longitudinal side of the upper wall 20, substantially perpendicularly to the upper wall 20, towards the bottom in the previously defined vertical orientation. According to the embodiment illustrated by the figures, the longitudinal dimension of the body 2 is greater than the transversal dimension thereof.

The head 1 is formed by an upper wall 10 and by two substantially vertical lateral flanks 11a, 11b, each extending from a longitudinal side of the upper wall 10 towards the bottom in the vertical orientation defined above. According to the embodiment illustrated by the figures, the upper wall 10 of the head 1 continues away from the body 2 until it reaches the edges 110a, 110b of the lateral flanks 11a, 11b opposite the edges of these flanks and by which the latter are attached to the upper wall 10 of the head 1.

The head 1 and the body 2 thus each exhibit a transversal section in the form of an inverted "U", of which the transversal leg is constituted by the upper walls, respectively 10 and 20, and of which the vertical legs are formed by the lateral flanks, respectively 11a, 11b and 21a, 21b, of these two parts of the adapter 100 according to the invention.

The upper walls, respectively designated 10 and 20, of the head 1 and of the body 2 of the adapter 100 according to the invention, as well as the lateral flanks, respectively designated 11a, 11b and 21a, 21b, define an internal volume 101 of this adapter. A suchlike volume is intended to receive all or part of the connector 8 supporting the wiper blade 7, and the mechanical link between the adapter 100 and the connector 8 is executed in the internal volume 101 of the adapter with the help of a means of connection in rotation 6.

According to an advantageous characterizing feature of an embodiment of the invention, a transversal dimension, that is to say the dimension in the previously defined axis Oy of the head 1, is greater than that of the body 2 measured in the same direction. In other words, the head 1 comprises an edge 14 that is substantially parallel to the vertical transversal plane (Oyz) of the previously defined orthonormal mark.

Likewise, a vertical dimension, that is to say the dimension in the previously defined axis Oz of the head 1, is greater than that of the body 2 measured in the same axis.

In other words the head 1, irrespective of whether it is separate or attached to the body 2, protrudes above and on the sides of this body 2. In other words, the head 1 is higher and wider than the body 2. The edge 14 of the head 1 with respect to the body 2 thus extends for the whole of the periphery of the interface between the head 1 and the body 2 of the adapter according to the invention.

According to an advantageous embodiment of the invention, the vertical and transversal dimensions of this edge 14 of the head 1 are substantially equal respectively to the thickness of the upper wall 50 of the yoke 500 and/or to the thickness of the side walls 51 of this same yoke 500, with which the adapter 100 according to the invention is intended to cooperate in such a manner that the free front edge 510 of this yoke 500 is able to bear against this edge 14 of the head 1. Suchlike characterizing features allow a head 1 to be obtained which is flush with the exterior faces of the yoke 500.

According to one aspect of the invention visible in FIG. 3 in particular, a hole 22 is disposed longitudinally in the upper wall 20 of the body 2 of the adapter 100. Advantageously, the transversal dimension, or width, of the hole 22 is substantially equal to the transversal dimension of the internal volume 101 or, in other words, to the distance, measured transversely, between interior surfaces 210a, 210b of the lateral flanks 21a, 21b of the body 2, which define this internal volume 101.

The adapter 100 according to the invention includes a means of engagement 3 referred to below as the first means of engagement. The adapter 100 also comprises a second means of engagement 4 separate from the first means of engagement 3. Advantageously, the first means of engagement 3 is disposed on the body 2 and the second means of engagement 4 is disposed on the head 1 of the adapter 100 according to the invention.

Advantageously, and as visible in FIGS. 2, 3, 6 and 7, the first means of engagement 3 consists, for example, of a pad 33 formed by a distal wall 30, from which a plurality of side walls 31 extends. According to the embodiment of the invention, although not exclusively and more particularly illustrated by the figures, the pad 33 is substantially parallelepipedic, and it thus includes four side walls 31 extending from its distal wall 30 and substantially perpendicularly thereto. Whatever the form adopted for the pad 33, the dimensions of the latter are defined, according to the invention, in order to be complementary to those of the opening 52 disposed in the upper wall 50 of the yoke 500 with which the adapter 100 is intended to cooperate, in order to permit easy insertion but without excessive play of this pad 33 in this opening 52.

According to the invention, the distal wall 30 of the pad 33 forming the first means of engagement 3 extends in the previously defined longitudinal direction Ox to the exterior of the previously defined internal volume 101. According to a characterizing feature of the invention, the pad 33 includes a step 32 disposed so as to extend above the upper wall 20 of the body 2. A suchlike step 32 is formed in the extension of the distal wall 30 of the pad 33, and this step 32 forms an excrescence which extends beyond one of the side walls 31 of this same pad 33, in this case being the front side wall under the reference 31*a*.

More specifically, this step 32 extends in the previously defined longitudinal direction in the direction of the head 1 of the adapter 100. In other words, with reference to the orientations defined above, the step 32 extends towards the front of the adapter 100 beyond the front side wall 31*a* of the pad 33 and overhanging the upper wall 20 of the body 2.

The second means of engagement 4, visible in FIGS. 2 to 7, includes a tooth 40 and a hook 41, for example. According to the invention, this second means of engagement 4 is disposed on the head 1 of the adapter 100. As indicated in the Figures, the tooth 40 extends, from the edge 14 of the head 1 of the adapter 100 in the longitudinal extension of the upper wall 10 of the head 1 in the direction of the body 2. In other words, and with reference to the directions and orientations previously defined, the tooth 40 extends towards the rear of the adapter 100 beyond the edge 14 and overhanging the transcurrent hole 22 when the adapter 100 is in its closed position, as illustrated by FIGS. 1, 2, 5 and 7.

The hook 41 extends within the part of the internal volume 101 of the adapter 100 defined by the upper wall 10 and by the lateral flanks 11*a*, 11*b*, of the head 1 of the adapter 100. More specifically, the hook 41 is formed by a substantially vertical foot 410, from which a substantially longitudinal attachment 411 extends. According to the embodiment illustrated in the figures, the hook 41 extends in a manner substantially centred in the transversal direction Oy, as does the tooth 40.

The foot 410 extends, in a substantially vertical direction, from an internal face of the upper wall 10 situated facing towards the internal volume 101 in the direction of this internal volume 101. In other words, with reference to the previously defined orientations, the foot 410 extends within the internal volume 101 substantially vertically towards the bottom. As indicated more particularly in FIGS. 3 and 7, the dimension of the foot 410 in the vertical direction Oz is smaller than the dimension of the internal volume 101 in this same vertical direction. According to the embodiment illustrated more particularly in the figures, the foot 410 is attached to the upper wall 10 in a region situated in the longitudinal direction Ox towards the rear of the head 1 in the immediate vicinity of the edge 14 of the head 1. In other words, the tooth 40 is situated between the body 2 and the foot 410 in the longitudinal direction Ox of extension of the adapter 100 in its closed position. This is also the case for the edge 14 of the head 1.

The attachment 411 extends from the free end of the foot 410 in a longitudinal direction substantially parallel to the longitudinal direction Ox in the direction of the body 2 of the adapter 100. In other words, the attachment 411 and the tooth 40 are substantially parallel one to the other. According to a characterizing feature of the invention, and as indicated more particularly in FIG. 7, the attachment 411 forms a bead 412 at its free end. The tooth 40 and the hook 41 thus define between them a housing 400, designated below as the receiving housing 400.

The second means of engagement 4 of the adapter 100 also includes a rib 9 disposed on or in the body 2 of this adapter 100, and more particularly visible in FIGS. 3, 4 and 7. A suchlike rib 9 acts as a counterpart on which the hook 41 engages. The rib 9 extends in a direction substantially parallel to the transversal direction Oy. A suchlike rib 9 extends at least in part in the extension of the upper wall 20 of the body 2. According to the embodiment illustrated by the figures, and with reference to the previously defined orientations, the rib 9 extends towards the bottom in a vertical or substantially vertical direction.

According to this embodiment, the rib 9 also extends between the interior walls of the lateral flanks 21*a*, 21*b* of the body 2 of the adapter 100 by bearing against these interior walls. As it is defined and described here, the rib 9, according to the embodiment illustrated by the figures, thus also forms a transversal reinforcement of the body 2 of the adapter 100 according to the invention.

Advantageously, the dimension of the rib 9 in the vertical direction Oz is smaller than that of the foot 410 of the hook 41 measured in this same vertical direction. On the other hand, the dimension of the rib 9 in this vertical direction Oz is smaller than that of the foot 410 of the hook 41 reduced by the measurement of the bead 412 measured in this same vertical direction.

According to a first embodiment illustrated in FIGS. 3 to 5, the invention proposes means of pivoting 200 the head 1 of the adapter 100 in rotation in relation to its body 2 about an axis Y2 substantially parallel to the transversal direction Oy.

FIGS. 4 and 5 depict close-up views of the head 1 and of the front end of the body 2 in section in a vertical longitudinal plane substantially parallel to the plane Oxz of the previously defined orthonormal mark. FIG. 4 depicts a view of the adapter 100 in an open position, in which the head 1 is pivoted in rotation in relation to the body 2 about the axis Y2, and FIG. 5 depicts a detailed close-up view of the means of pivoting 200 in the closed position of the adapter 100 in which the head 1 and the body 2 extend one as a longitudinal extension of the other. FIG. 4 shows the lateral flank 21*b* of the body 2, from which there extends a strand 61 which forms an illustrative embodiment of the means of connection in rotation 6. FIG. 4 also illustrates in cross section the upper wall 10 of the head 1, the tooth 40 and the hook 41 of the second means of engagement 4.

An articulation strap 201*b* disposed within the internal volume 101 forms an example of the means of pivoting 200. This articulation strap 201*b* emerges in particular from an interior wall 111*b* of a lateral flank of the head 1 from a first base 203. It should be noted that the invention extends to the case where two articulation straps are provided, each emerging from a lateral flank of the head 1 of the adapter 100.

Each articulation strap 201*b* extends from the wall on which it is disposed towards the interior of the internal volume 101. In order to permit the desired articulation during the pivoting in rotation of the head 1 in relation to the body 2, each articulation strap 201*b* extends over a transversal dimension that is close to, but smaller than, the transversal dimension of an additional clearance, respectively 211*a*, 211*b*, disposed in the interior of the internal volume 101. A suchlike clearance extends along the lateral flanks 21*a*, 21*b* of the body 2. Each articulation strap 201*b* is also attached to the body 2 in the area of the edge 14 of the head 1. This connection is effected by means of a second base 202*a*, 202*b* coming from the lateral flank 21*a*, 21*b* of the body 2.

Each articulation strap thus comprises a first base coming from a lateral flank of the head, a second base coming from a lateral flank of the body 2 and a flexible loop 204 which extends between the first base and the second base.

According to the embodiment illustrated by way of example in FIGS. 3 and 4, the clearances 211*a*, 211*b* are defined in particular by two crossmembers, respectively 212*a*, 212*b*, which extend the lateral flanks 21*a*, 21*b*, of the body 2 longitudinally, within the internal volume 101 and in the direction of the head 1. Each of the crossmembers 212a, 212b exhibits a thickness in the transversal direction Oy smaller than that of the lateral flank 21a, 21b, in the longitudinal extension from which it extends. In addition, each crossmember 212a, 212b, is disposed in such a way that its interior wall is situated in the longitudinal extension of the interior wall 210a, 210b of the corresponding lateral flank. Each clearance 211a, 211b is thus defined by a crossmember 212a, 212b, by a second base 202a, 202b, by a first base 203 and by the interior wall 111b of the lateral flanks of the head 1, when the adapter 100 is in its closed position.

The articulation of the head 1 in relation to the body 2 thanks to the means of pivoting 200 is effected by rotation of the head 1 about the transversal axis Y2 which passes through the head 1 in the vicinity of the lower edges 110a, 110b of each of the lateral flanks 10a, 10b of this head. The transversal axis Y2, substantially parallel to the transversal direction Oy of the adapter 100, is advantageously situated on the exterior of the internal volume 101 in order to permit the most extended angular pivoting possible of the head 1 in relation to the body 2. In order to do this, the constituent loop 204 of the articulation strap emerges on the exterior of the internal volume 101.

When the head 1 is pivoted in rotation about the transversal axis Y2 in relation to the body 2, it is displaced in a substantially longitudinal vertical plane towards the bottom with reference to the previously defined orientations. More specifically, in this pivoting in rotation, the tooth 40 and the hook 41 move away from the body 2 of the adapter 100 in the longitudinal and vertical directions.

For its association to a connector 8 a of a wiper blade, the adapter 100 according to the invention includes at least one means of connection 6 in rotation. According to the embodiment of the invention illustrated by the figures, this means of connection in rotation includes, disposed from the interior surface 210b defining the internal volume 101, a single substantially cylindrical strand 61, centred on a transversal axis of rotation Y1 of the adapter 100 in relation to the connector 8. According to the embodiment illustrated in FIG. 6, the strand 61 is supported by the lateral flank 21b of the body of the adapter 100.

It goes without saying that any equivalent means may be implemented for the embodiment of the means of connection 6 in rotation of the adapter 100 to its connector 8 without this having an adverse effect on the invention: it is thus conceivable, although not exhaustively, that two substantially cylindrical strands, centred on the transversal axis of rotation Y1, are disposed face-to-face within the internal volume 101 of the adapter in order to cooperate with a hole 80 of complementary form and disposed on the connector, as visible in FIG. 7. It is also possible for this connection in rotation to be achieved by the cooperation of strands disposed on the connector with one or a plurality of holes provided in the lateral flanks of the adapter according to the invention and centred on this same transversal axis Y1. In an alternative manner, it is conceivable for the connector and the adapter to be provided with coaxial holes in which a shaft, in particular a metallic shaft, is accommodated.

Advantageously, the transversal axis of rotation Y1 intersects the body 2 of the adapter 100 according to the invention in proximity to the edge 14 defining the head 1 next to the body 2. Advantageously, the diameter of the substantially cylindrical strand 61 is defined in order to permit its engagement in the complementary hole 80, visible in FIG. 7, disposed on the connector 8. It must be noted here, however, that the means of connection 6 in rotation is situated, in the longitudinal direction of the adapter 100 according to the invention, substantially between the first means of engagement 3 and the second means of engagement 4 and, more particularly, between the first means of engagement 3 and the means of pivoting 200 in rotation.

FIGS. 6 and 7 illustrate the assembly of the adapter 100 according to the invention with the yoke 500 of the type described previously. In these figures, the adapter 100 is represented pre-assembled with a connector 8 that is integral with a wiper blade. According to the embodiment more particularly described here and illustrated in FIGS. 6 and 7, the assembly of the adapter 100 according to the invention with the connector 8 secured to the wiper blade is effected by the engagement of a substantially cylindrical strand 61 supported by the adapter 100 in the hole 80 disposed in the connector 8. When assembled in this way, the adapter 100 and the connector 8 form a connection device for attaching a wiper blade 7 to a drive arm 5.

It should be noted that, once preassembled in this way, the connector 8 and the adapter 100 exhibit a freedom in rotation, one in relation to the other, about the transversal axis Y1 of the means of connection 6 in rotation.

The assembly of the adapter 100 with a yoke 500 of a drive arm 5 as illustrated in FIG. 6 is effected, as a first step, by the engagement of the first means of engagement 3 with the upper wall 50 of the yoke 500. In order to accomplish this engagement, the adapter 100 is inclined relative to the yoke 500 and is then engaged within the receiving volume 54 of the latter in such a way that the pad 33 forming its first means of engagement 3 may be inserted into the opening 52 of this yoke 500.

Once the pad 33 and its step 32 have been inserted into the opening 52, the assembly of the adapter 100 with the yoke 500 is effected by a movement of rotation of the whole of the adapter 100 about a transversal axis parallel to the aforementioned axis Y1 and passing through a point of contact between the pad 33 and an edge of the opening 52. This movement of rotation is illustrated by the arrow F1 in FIG. 6. As a result, it brings the upper wall 20 of the body 2 against the upper wall 20 of the yoke 500.

The adapter 100 is placed beforehand in an open position by pivoting in rotation of the head 1 in relation to the body 2 about the axis Y2 in the direction illustrated by the arrow F2 in FIG. 6 as far as the first embodiment is concerned. As far as the second embodiment is concerned, the adapter 100 is placed beforehand in an open position by separation of the head 1 in relation to the body 2.

Once the upper wall 20 of the body 2 is bearing against the upper wall 50 of the yoke, the head 1 is attached to the body 2 or is pivoted towards the body 2, as illustrated by the arrow F3, depending on the embodiment of the invention. The respective dimensions and configurations of the hook 41 and of the rib 9 are defined, according to the invention, in such a way that the rib 9 engages in the space present between the foot 410 of the hook, its attachment 411 and its bead 412. In other words, the rib 9 then engages in the receiving housing 400 defined previously and defined by the tooth 40 and the hook 41 of the second means of engagement 4. In other words, once again, the rib 9 is hooked via the hook 41 within the receiving housing 400. It should be noted that the rib 9 is pressed against the hook 41 and against the upper wall 50 of the yoke 500, the latter in addition bearing against the tooth 40.

The movement of rotation continues until contact is made with the edge 14 of the head 1 against the front free terminal edge 510 of the yoke 500. The tooth 40 of the second means of engagement 4 is then engaged, with reference to the previously defined orientations, above the upper wall 50 of the yoke 500 on the exterior of the receiving volume 54 defined thereby. In other words, with reference to the previously defined orientations, the upper wall 50 of the yoke 500 is then engaged in the receiving housing 400 with the rib 9.

In these movements of pivoting in rotation about the substantially transversal axis Y2, the articulation straps 201a, 201b bend around the axis Y2. Advantageously, the dimensions of these different elements are defined in such a way that the crossmembers 212a, 212b and the interior walls of the lateral flanks 10a, 10b of the head 1 provide transversal guiding of the head 1 in relation to the body 2.

It follows from the above, and as indicated more particularly in FIG. 7 that in this position the upper wall 50 of the yoke 500 is received in the receiving housing 400 above the rib 9. It is pinched and blocked there in the vertical direction Oz, on the one hand by the tooth 40, and on the other hand by the rib 9, which is itself blocked in this same vertical direction by the attachment 411. Furthermore, in this position, the rib 9 is blocked in the hook 41 in the longitudinal direction Ox by the presence of the bead 412 which then constitutes a means of locking the adapter 100 to the yoke 500 by the concurrent accommodation of the upper wall 50 of the yoke 500 in the receiving housing 400.

The rib 9 and the upper wall 50 of the yoke 500 are thus enclosed, that is to say sandwiched, in the vertical direction Oz between, on the one hand, the attachment 411 of the hook 41 and the tooth 40.

The insertion of the step 32 in the through opening 52, followed by the complete insertion of the pad 33 into this opening 52 produces an additional engagement of the adapter 100 in the yoke 500 and an additional locking of this assembly in the longitudinal direction Ox.

When the adapter 100 is housed in and engaged on the yoke 500, the upper wall 20 of the body 2 bears against the upper wall 50 of the latter within the receiving volume 54 of this yoke, and the lateral flanks 21a, 21b of this same body 2 advantageously bear against the side walls 51 of the yoke 500 within this same receiving volume 54. The upper wall 50 of this yoke 500 is thus also enclosed between, on the one hand, the upper wall 20 of the body 2 of the adapter 100 and, on the other hand, the step 32 of the first means of engagement 3.

It should also be noted that, once the adapter 100 according to the invention has been assembled with the yoke 500 of the drive arm 5, the upper walls, respectively 50 and 10, of this yoke 500 and of the head 1 of this adapter, as well as the side walls 51 of this yoke and the lateral flanks 11 of the head 1 of this adapter, advantageously form a continuous surface, thereby contributing to the aesthetics of the whole and also eliminating any zone of possible accumulation of debris, dirt or particles that are potentially harmful to the proper functioning of the whole.

In order to separate the adapter 100 from the yoke 500, it is sufficient to pivot the head 1 in relation to the body 2 in rotation about the substantially transversal axis Y2 in the direction illustrated by the arrow F2 in FIG. 6. In other words, it is sufficient to bring the adapter 100 into an open position. This pivoting of the head 1 disengages the tooth 40 from the upper wall 50 of the yoke 500. This movement is made possible by the elasticity of the hook 41 and, more particularly, of its foot 410, which elasticity results from its form and from the nature of the material which constitutes the adapter 100. By continuing this opening movement of the adapter 100, it becomes possible to pivot the body 2 of the adapter 100 in order to disengage it completely from the yoke 500 in a direction opposite that illustrated by the arrow F1.

The invention thus makes it possible to achieve the simple and effective engagement of an adapter 100 both with a drive arm 5 exhibiting a specific yoke of the type described previously and with a connector 8 that is integral with a wiper blade 7, in order to form a part of a wiper system for a motor vehicle.

The invention should not, however, be restricted to the described and illustrated means and configurations, and it is also applicable to equivalent means or configurations and to any combination of such means.

The invention claimed is:

1. An adapter configured to attach a wiper blade to a drive arm of a wiper system for a motor vehicle, the adapter comprising:
a head and a body which extend, one as an extension of the other, in a longitudinal direction of the adapter; and
a means of connection in rotation to a connector that is integral with the wiper blade,
the head and the body of the adapter each being formed at least by an upper wall, from which at least two lateral flanks emerge so as to define an internal volume into which the connector is capable of extending,
the body of the adapter comprising a first means of engagement to engage the adapter with a yoke of the drive arm, and
the head of the adapter comprising a second means of engagement to further engage the adapter with the yoke, the second means of engagement comprising a tooth and a hook,
wherein in a closed position of the adapter:
the hook engages a rib of the body to lock the head to the body, the rib extending from one lateral flank to the other, and
the tooth and the rib form a gap therebetween that is configured to receive an upper wall of the yoke.

2. The adapter according to claim 1, wherein the tooth protrudes beyond an edge which defines the head.

3. The adapter according to claim 2, wherein the tooth protrudes above an upper wall of the body to an exterior of the internal volume.

4. The adapter according to claim 1, in wherein the hook is formed by a foot which extends within the internal volume and by an attachment which extends from a free end of the foot substantially parallel to the tooth in the direction of the body.

5. The adapter according to claim 4, wherein the attachment further comprises a bead.

6. The adapter according to claim 5, wherein the bead of the hook forms a means of longitudinal blocking of the head on the body.

7. The adapter according to claim 1, wherein the rib extends within the internal volume in a substantially transversal direction perpendicular to a longitudinal axis of extension of the body.

8. The adapter according to claim 1, further comprising means of pivoting of the head in relation to the body in rotation about an axis substantially transversal to a longitudinal axis of the adapter.

9. The adapter according to claim 8, wherein the means of pivoting in rotation about the substantially transversal axis include at least two articulation straps, each disposed between a lateral flank of the head and a lateral flank of the body.

10. The adapter according to claim 1, wherein the body further comprises at least two crossmembers, which extend within the internal volume in the direction of the head in the longitudinal extension of the lateral flanks of the body.

11. The adapter according to claim 1, wherein the first means of engagement comprises a pad defined by a distal wall and by side walls which extend substantially perpendicularly to the distal wall.

12. The adapter according to claim 11, wherein the pad protrudes from an upper wall of the body to the exterior of the internal volume.

13. The adapter according to claim 11, in which the pad further comprises at least a step which extends in the longitudinal direction beyond at least one of the side walls defining the pad.

14. The adapter according to claim 13, wherein the step extends longitudinally in the direction of the head.

15. The adapter according to claim 1, wherein the first means of engagement and the second means of engagement are provided longitudinally to either side of the means of connection in rotation.

16. A connection device comprising: an adapter according to claim 1; and a connector capable of being secured to a wiper blade, wherein the adapter and the connector are connected by the means of connection in rotation.

17. A wiper system comprising: a wiper blade; a drive arm; and an adapter according to claim 1, wherein the adapter is housed in a yoke of the drive arm, in which the first means of engagement and the second means of engagement are disposed in relation to an upper wall of the body in such a way as to enclose an upper wall of the yoke.

18. The wiper system according to claim 17, in which an engagement pad of the first means of engagement extends in an opening disposed in the upper wall of the yoke.

* * * * *